March 23, 1954  J. A. NORTHCOTE  2,672,762
PIVOTAL BEVEL GEARING
Filed July 13, 1950  2 Sheets-Sheet 1
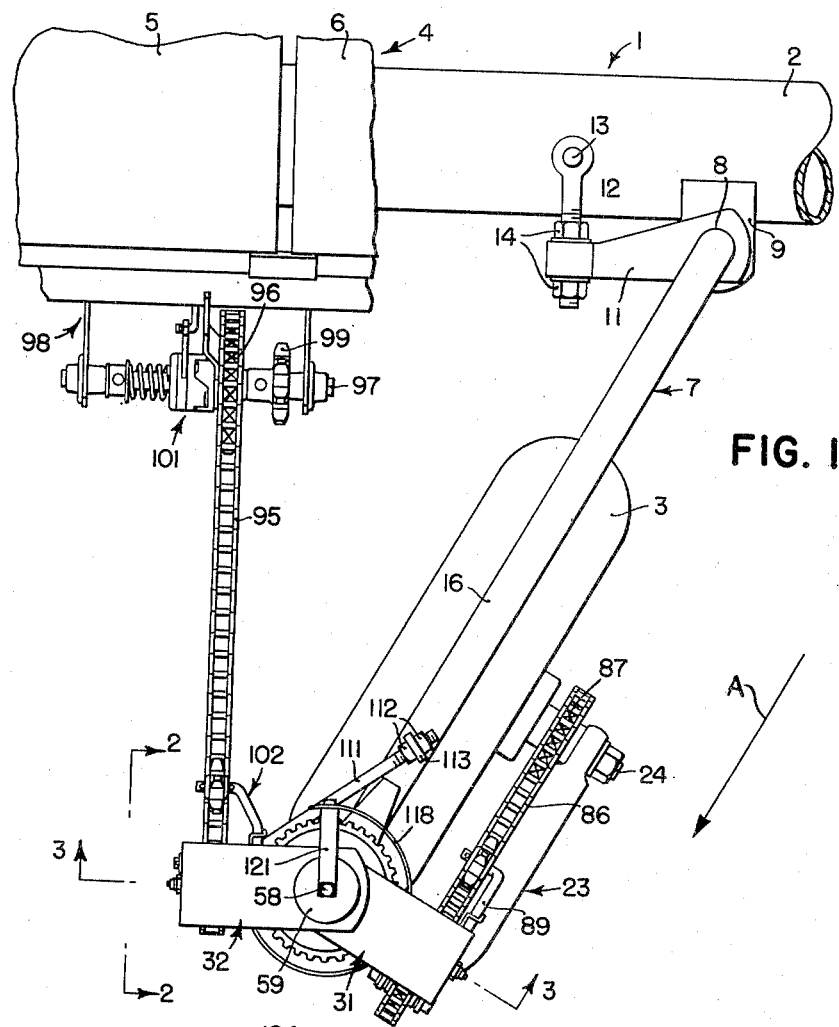
FIG. 1
FIG. 2
INVENTOR.
JOHN A. NORTHCOTE
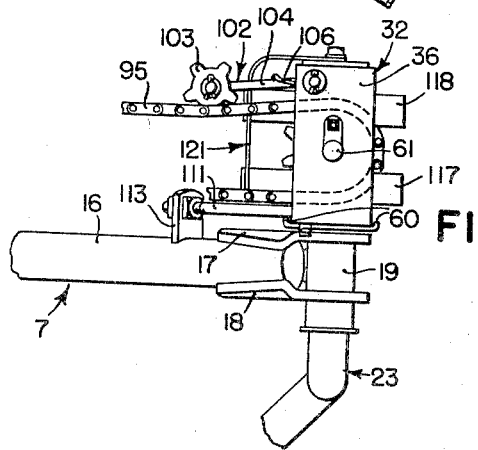
ATTORNEYS

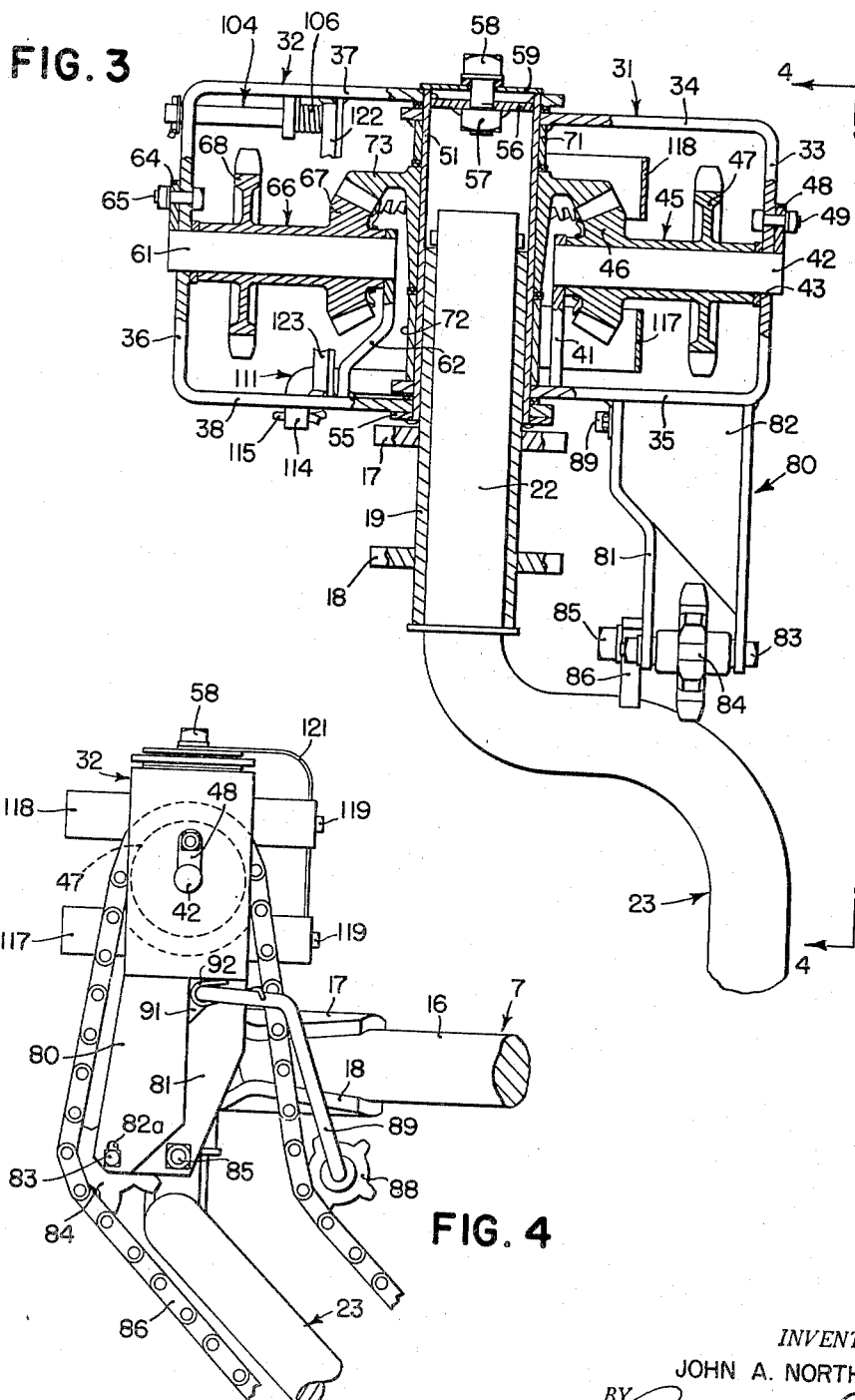

Patented Mar. 23, 1954

2,672,762

UNITED STATES PATENT OFFICE 2,672,762

PIVOTAL BEVEL GEARING

John A. Northcote, Welland, Ontario, Canada, assignor to John Deere Plow Company (Limited), Welland, Ontario, Canada, a corporation of Canada Application July 13, 1950, Serial No. 173,585

11 Claims. (Cl. 74—385)

The present invention relates generally to agricultural machines and more particularly to implements having one or more operating units adapted to be driven from one of the ground wheels on which the implement is supported.

The object and general nature of the present invention is the provision of new and improved mechanism for driving the operating unit or units of an agricultural implement from one of the ground wheels of the implement, which means includes a pair of pivotally interconnected gear frame units swingably associated with the laterally swingable spindle on which the ground wheel is carried. More particularly, it is an important feature of this invention to provide a drive gearing particularly adapted for use with castering wheels and which may readily be attached to the implement in fully assembled condition, whereby there is little likelihood of any of the parts getting out of adjustment during the setting up of the implement for operation in the field.

These and other objects and advantages of the present invention will be apparent to those skilled in the art after a consideration of the following detailed description, taken in conjunction with the accompanying drawings, in which:

Figure 1 is a plan view of a portion of a disk tiller equipped with one or more seeding units which are driven, according to the principles of the present invention, from the castering land wheel of the tiller.

Figure 2 is a fragmentary side view, taken generally along the plane of the line 2—2 of Figure 1.

Figure 3 is a sectional view, at a somewhat larger scale, taken generally along the line 3—3 of Figure 1.

Figure 4 is a fragmentary side view, taken generally along the plane of the line 4—4 Figure 3.

Referring now more particularly to Figure 1, the agricultural implement in which the principles of the present invention have been incorporated is shown as a disk tiller 1 having a main tubular frame 2 supported on front and rear wheels, including a rear castering land wheel 3. The implement 1 is provided with a seeding attachment 4 which includes a plurality of grain boxes 5 and 6 supported on the frame 2 and including driven seeding mechanisms (not shown) of conventional construction. The implement 1 normally is propelled by any suitable means, such as a farm tractor or the like, in the direction indicated by the arrow A in Figure 1. Secured to and forming a part of the implement frame 2 is a wheel bracket 7 which includes a rear downwardly extending portion 8 that is connected to the main frame member 2 by a pair of apertured lugs 9. The downwardly extending portion 8 of the wheel bracket 7 has an arm 11 secured thereto, as by welding, and the lateral position of the wheel bracket 7 may be adjusted relative to the frame 2 by means of an eyebolt 12, one end of which is connected to a stud 13 and the frame 2, the other end being threaded and receiving a pair of lock nuts 14 which are disposed on opposite sides of the outer apertured end of the arm 11. The wheel frame 7 also includes an upper forwardly extending section 16 which at its forward end receives, as by welding, a pair of upper and lower bracket plates 17 and 18 which are apertured and have secured thereto a vertical sleeve section 19 which is welded or otherwise permanently fixed to the upper and lower bracket plates 17 and 18. Rockably mounted in the vertical sleeve section 19 is the upper end 22 of a spindle or axle 23, the lower end of which is angled rearwardly and carries a stub axle 24 on which the wheel 3 is journaled for rotation. The spindle or axle 23 thus swings about a generally vertical axis as defined by the vertical sleeve section 19, relative to the implement frame 2, whereby the wheel 3 is mounted to swing about said vertical axis and to roll forwardly in the direction of travel at all times.

The mechanism by which the seeding means in the hoppers 5 and 6 is actuated from the ground wheel 3 will now be described. Mounted on the upper portion of the vertical sleeve section 19 is a pair of gear frames 31 and 32. The gear frame 31 comprises a U-shaped member having an intermediate section 33 and upper and lower side sections or legs 34 and 35. The other gear frame member 32 is of similar construction, including an intermediate section 36 and upper and lower side sections or legs 37 and 38. The gear frame member 31 has an upstanding lug 41 connected, as by welding, to the inner end of the lower side section 35, the upper end of the lug 41 being apertured to receive the inner end of a stub shaft 42, the outer end of which extends outwardly through an opening 43 in the intermediate section 33 of the gear frame member 31. Rotatably mounted on the stub shaft 42 is a gear member 45 which includes a laterally inner pinion section 46 and an outer or sprocket gear section 47. An upstanding apertured lug 48 is fixed, as by welding, to the outer end of the stub shaft 42, and the gear frame section 33 is apertured to receive a bolt 49 which extends through the aperture in the lug 48 and serves thereby to detachably hold the stub shaft 42 in position in the gear frame 31.

The laterally inner ends of the upper and lower frame sections 34 and 35 are apertured to receive a vertically extending sleeve 51, the lower portion of which is disposed snugly about the upper portion of the vertical sleeve section 19. An abutment ring 55 is welded or otherwise fixed to the lower end of the vertical sleeve 51 and receives the apertured, laterally inner end of the lower side member 38 of the other gear frame member 32. The laterally inner end of the upper side member 37 of the gear frame member 32 is likewise apertured and receives the upper end of the sleeve 51. The upper end of the latter carries a closure 56, preferably in the form of a washer, securely welded to the upper end of the vertical sleeve 51. A nut 57 is secured, as by welding, to the inner face of the closure 56 and receives a bolt 58 which serves as means for securely clamping a cap member 59 to the upper end of the sleeve 51. The cap member 59 extends laterally outwardly beyond the sleeve so as to engage the side member 37 of the gear frame 32, and since the upper and lower side sections of the other gear frame 31 lie between the upper and lower side members 37 and 38 of the gear frame 32, the two pivotally interconnected frames are thus held in assembled relation, one pivoting relative to the other about the sleeve 51. The lower abutment member 55 as turned up portions 60 (Figure 2) which cooperate with the lower side section 38 of the gear frame 32 to cause the sleeve 51 to turn with the gear frame 32. Like the gear frame 31, the gear frame 32 carries a stub shaft 61, the inner end of which is carried in an aperture formed in a lug 62 which is welded at its lower end to the lower side section 38, and the central section 36 of the gear frame is apertured to receive the outer end of the stub shaft 61. The outer end of the latter receives a lug 64 which is removably held in place by a bolt 65. Rotatably mounted on the stub shaft 61 is a compound gear member 66 which includes an inner pinion 67 and an outer sprocket gear section 68, the member 66 preferably being identical with the compound gear member 45 described above. Similarly, the stub shafts 42 and 61 preferably are identical.

The gear frame 31 carries upper and lower bearing members 71 and 72, preferably welded, respectively, to the upper and lower side sections 34 and 35, the bearing members 71 and 72 receiving the vertical sleeve 51, and in the space between the upper and lower bearing members 71 and 72 is a bevel gear 73 which meshes with the two pinion sections 46 and 67.

The gear frame 31 has depending frame section 80 which includes an offset plate section 81 and an angle section 82, both being welded to the lower side section 35 of the gear frame 31 and extending downwardly therefrom. The ends of the depending frame sections 81 and 82 are slotted, as at 82a (Figure 4), to receive a bolt 83 on which an idler sprocket 84, which is disposed in the plane of the sprocket member 47, is disposed. Also, the lower end of the offset plate section 81 is apertured to receive a bolt 85 which fastens the part 81 to a lug 86 which is welded to the spindle 23. By virtue of this construction, the gear frame 31 is caused to swing relative to the other gear frame 32 with the spindle member 23 and the ground wheel 3. A driving chain 86 is trained over the idler sprocket 84, the sprocket member 47 and the sprocket 87 connected to be rotated by the ground wheel 3, as best shown in Figure 1. A second idler sprocket 88 is mounted on a downwardly extending arm 89, the upper end of which is pivotally carried in an aperture in a lug 91 and an aperture in the upper portion of the offset plate member 81. A torsion spring 92 yieldably pivots arm 89 to press the idler sprocket 88 against the chain 86. Thus, the ground wheel 3, acting through the sprocket 87 and chain 86, drives the compound gear member 45 in any position of the caster wheel 3, and the bevel pinion 46 of the gear member 45 serves to drive the bevel gear 73. Rotation of the bevel gear member 73 acts through the bevel pinion 67 to drive the sprocket section 68 of the compound gear member 66, and rotation of the member 66 is utilized for driving the seeding mechanism of the hopper or hoppers carried by the implement frame 2. To this end, a sprocket chain 95 is trained over the sprocket gear member 68 and over a similar sprocket gear member 96 that is loosely mounted on a shaft 97 carried by suitable bearing means in a jackshaft frame 98 fixed to one or more of the hoppers on the implement 1. The sprocket member 96 is controllably connected to drive the shaft 97, on which a drive sprocket 99 is fixed, by any suitable means, such as a clutch unit 101, the particular details of which are of no concern in the present invention. The chain 95 is maintained in operating tautness by a spring-biased idler 102 which includes a chain-engaging idler sprocket 103 mounted for rotation on an arm 104 pivotally connected with the gear frame 32, as best shown in Figure 3. The idler arm 104 is biased for downward movement by a torsion spring 106.

The gear frame 32 is connected with the wheel frame member 7 by a rod 111, the forward or inner end of which is threaded to receive a pair of lock nuts 112 which are disposed on opposite sides of an apertured lug 113 which the threaded end of the rod 111 extends, as best shown in Figure 1. The other end of the rod member 111 is bent laterally downwardly, as indicated at 114 in Figure 3, and extends through an opening in the lower side member 38 of the gear frame 32, being held in position therein by a cotter 115 or other suitable means. The position of the gear frame 32 relative to the wheel frame 7 may be adjusted, as desired, by loosening one of the lock nuts 112 and tightening the other. By virtue of this adjustment, the sprocket 68 may be accurately lined up with the sprocket 96, as best shown in Figure 1.

The main bevel gear 73 and the bevel pinions 46 and 67 are protected by means of a pair of arcuate shields 117 and 118. One end of each of the shields is bolted, as at 119, to a bracket 121 which has its upper section turned forwardly and held in position by the bolt 58. The other end of the upper shield 118 is fixed by any suitable means to a lug 122 which is carried by the upper member 37 of the gear frame 32, and the other end of the lower shield 117 is similarly fixed to a lug 123 fixed to the lower section of the gear frame 32, as best shown in Figure 3. The shields 117 and 118 extend counterclockwise (as viewed in Figure 1) from the bolts 119 to the lugs 122 and 123 in paths the lengths of which are about three-fourths of the arcs of the corresponding circles.

The drive gearing of the present invention may readily be installed on an agricultural implement of the type described, merely by applying the interconnected gear frames 31 and 32 over the upper portion of the vertical sleeve section 19, and then connecting the depending frame section 80 to the lug 86, and the rod 111 between the gear frame 32 and the lug 113 on the wheel frame. Installation of the drive chains 86 and 95 then completes the assembly of the ground wheel driven means of the present invention on the implement for actuating the seeding units thereof.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desired to secure by Letters Patent is:

1. In a seeding attachment for an agricultural implement, driving mechanism therefor comprising a pair of pivotally interconnected gear frames, each comprising a generally U-shaped part having vertically spaced apart legs disposed horizontally, a vertical sleeve fixed to the upper and lower legs of one of said frame members, the other frame member being apertured to receive the upper and lower portions of said vertical sleeve, the legs of said other frame member having relatively short, axially extending bearing sleeve sections disposed about the upper and lower portions of said vertical sleeve, a bevel gear disposed about said vertical sleeve between said bearing sleeve sections, a stub shaft carried by each of said frame members, and a pinion rotatably mounted on each of said shafts, said pinions being adapted to mesh with said bevel gear.

2. In a seeding attachment for an agricultural implement, driving mechanism comprising a pair of gear frames, one including a sleeve section, means for swingably connecting the other of said gear frames for movement about said sleeve section, a gear rotatable about said sleeve section, a pair of gear means, one carried by each of said gear frames and each meshing with said gear, means for transmitting driving power to one of said gear means, means carried by the other of said gear frame for holding said first mentioned gear against axial displacement, and means connected with the other of said gear means for transmitting the drive to a point of utilization.

3. In an agricultural implement including a wheel bracket having a vertical sleeve section and a castering spindle swingably mounted in said vertical sleeve section; driving mechanism comprising a pair of gear frames, means pivotally interconnecting said gear frames, comprising a generally vertical sleeve adapted to surround and be mounted on said vertical sleeve section, a generally horizontal gear rotatably mounted on said vertical sleeve, a pair of pinions rotatably supported, respectively, by said articulated frame members and in mesh with said horizontal gear, means for transmitting the drive to one of said pinions, means receiving the drive from the other of said pinions and transmitting it to a point of utilization, and means surrounding said vertical sleeve above and below said horizontal gear and carried by one of said frames for holding said horizontal gear against vertical displacement.

4. For use with an agricultural machine including a vertical sleeve section, driving mechanism comprising a pair of articulated gear frames, means pivotally connecting said gear frames including a generally vertical sleeve adapted to be disposed in a vertical position about said vertical sleeve section, means connecting said vertical sleeve with one of said frames so as to rotate therewith about the axis of said vertical sleeve section, a gear member disposed rotatably about said vertical sleeve, a shaft and a pinion rotatably mounted thereon carried by each of said frames, said pinions meshing with said gear member, a pair of sleeve sections carried by said other gear frame and disposed above and below said gear member for holding the latter against axial displacement relative to said vertical sleeve, and means for detachably fixing each of said shafts to the associated gear frame.

5. The invention set forth in claim 4, further characterized by a closure at the upper end of said vertical sleeve, an abutment at the lower end of said vertical sleeve, and means connected with said closure for holding said gear frame members in pivotal relation with respect to said vertical sleeve.

6. The invention set forth in claim 4, further characterized by shield means carried by one of said gear frames and encircling said gear member and the associated pinion for protecting said gear and pinions.

7. Driving mechanism comprising a pair of generally U-shaped frames, each frame having upper and lower leg portions that are apertured, a cylindrical member extending through said apertures and thereby pivotally interconnecting said frames, a gear mounted in a generally horizontal plane about said cylindrical member and rotatable relative thereto, means including a pinion carried by each of said frames, said pinion meshing with said gear, means at the lower end of said cylindrical member for connecting the latter with one of said frames, so as to cause them to rotate together, and means carried at the upper end of said cylindrical member for holding said gear frames in pivotally interconnected relation.

8. Driving mechanism comprising a central cylindrical member, a pair of U-shaped frames having apertured ends swingably mounted on said cylindrical member, a gear member mounted for rotation on said cylindrical member between the end portions of said U-shaped frames, shaft sections carried by said frames, and gear means rotatably mounted on said shaft sections and meshing with said gear member.

9. Driving mechanism as defined in claim 8, further characterized by each of said frame members including a bracket disposed adjacent said cylindrical member, said bracket and a portion of the associated frame being apertured to receive said shaft section, and means for removably fixing each shaft section to the associated frame.

10. The invention set forth in claim 9, further characterized by each shaft section including an apertured lug, and means for fixing each lug to the associated frame.

11. Driving mechanism associated with a pair of relatively swingable parts, said driving mechanism comprising a central cylindrical member, a pair of U-shaped frames having apertured ends swingably mounted on said cylindrical member, a gear member mounted for rotation on said cylindrical member between the end portions of said U-shaped frames, shaft sections carried by said frames, gear means rotatably mounted on said shaft sections and meshing with said gear member, a part connected with one of said frames for fixing it against rotation relative to one of said parts, and a second attaching means connected between the other frame and the part associated therewith, said second connecting means being adjustable to provide for changing the position of said second frame relative to the associated part.

JOHN A. NORTHCOTE.

References Cited in the file of this patent

UNITED STATES PATENTS

| Number | Name | Date |
|---|---|---|
| 66,052 | Smith | June 25, 1867 |
| 589,628 | Storm | Sept. 7, 1897 |
| 710,883 | Palmer | Oct. 7, 1902 |
| 760,442 | Fry | May 24, 1904 |
| 1,101,151 | Skovbroten | June 23, 1914 |
| 1,284,047 | Bloom | Nov. 5, 1918 |
| 1,489,133 | Kumler | Apr. 1, 1924 |